Feb. 6, 1951 P. L. SPENCER Re. 23,337

HIGH EFFICIENCY MAGNETRON

Original Filed Jan. 25, 1943 2 Sheets-Sheet 1

INVENTOR
PERCY L. SPENCER
BY Elmer J. Gorn
ATTORNEY

HIGH EFFICIENCY MAGNETRON

Original Filed Jan. 25, 1943 2 Sheets-Sheet 2

INVENTOR
PERCY L. SPENCER
BY Elmer J. Gorn
ATTORNEY

Reissued Feb. 6, 1951

Re. 23,337

UNITED STATES PATENT OFFICE 23,337

HIGH EFFICIENCY MAGNETRON

Percy L. Spencer, West Newton, Mass., assignor to Raytheon Manufacturing Company, West Newton, Mass., a corporation of Delaware Original No. 2,410,396, dated October 29, 1946, Serial No. 473,557, January 25, 1943. Application for reissue June 15, 1950, Serial No. 168,321

2 Claims. (Cl. 315—39)

Matter enclosed in heavy brackets [ ] appears in the original patent but forms no part of this reissue specification; matter printed in italics indicates the additions made by reissue

This invention relates to a magnetron, and more particularly to a magnetron which generates osciliations within one or more cavities formed within its anode structure, and in which the frequency of said oscillations is determined primarily by the geometry of said cavities.

With prior devices of the above type, where a plurality of oscillating cavities were used and the oscillations were led off through coupling means associated with one of said cavities, energy was fed from one cavity to the next with subsequent difficulty, resulting in a decrease in efficiency. Also said prior devices were very critical as to the spacing between the side walls at the entrance to the cavity, thus introducing the problem of extensive and time-consuming machine work and constructing such cavities within the necessary critical tolerances.

An object of the present invention is to increase the ease of transfer of energy from one oscillating anode cavity to another in a plural cavity magnetron.

A further object is to decrease the effect of the spacing between the anode arms at the entrance to the anode cavity on the generated frequency.

A still further object is to contribute to each of the foregoing objects by increasing the ratio between the inductance and capacity of each oscillating cavity within certain limits.

The foregoing and other objects of this invention will be best understood from the following description of exemplifications thereof, reference being had to the accompanying drawings, wherein.

Figure 1:
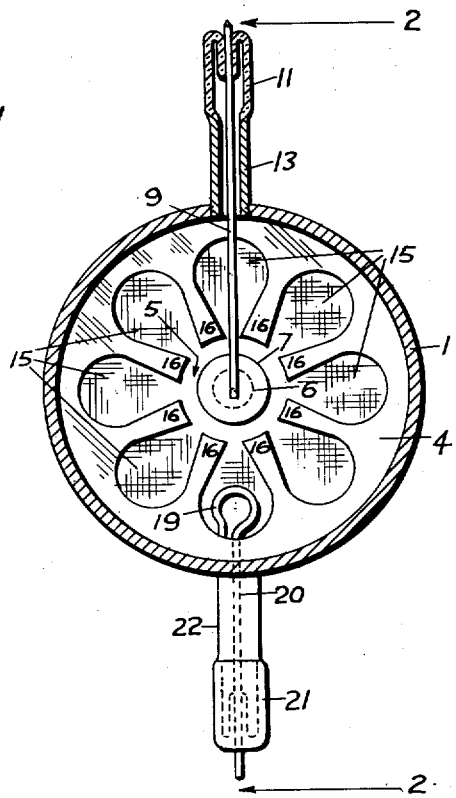
Fig. 1 is a transverse section of a magnetron embodying my invention, taken along line 1—1 of Fig. 2.
Figure 2:
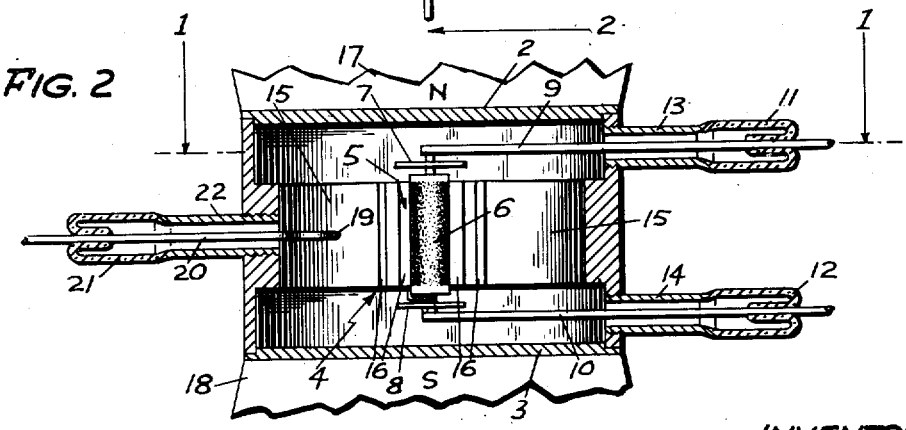
Fig. 2 is a longitudinal cross-section taken along line 2—2 of Fig. 1.

The magnetron illustrated in Figs. 1 and 2 comprises an envelope 1 which is preferably made of a block of conducting material, such as copper. This block forms the anode structure of the magnetron. The block has hollow end sections which are covered by caps 2 and 3, likewise of conductive material, such as copper. Between the hollow end sections of the block 1 is located a centrally-bridging portion 4. The portion 4 is provided with a central bore 5 within which is supported, substantially at the center thereof, a cathode 6 which may be of the indirectly-heated oxide-coated thermionic type. Light conducting shields 7 and 8 may be supported adjacent the upper and lower ends of the cathode 6 so as to prevent electron beams from being projected out toward the end caps 2 and 3. The cathode is supported by a pair of cathode lead-in conductors 9 and 10 sealed through the glass seals 11 and 12 mounted at the outer ends of pipes 13 and 14 hermetically fastened within the walls of the block 1 adjacent the upper and lower hollow end sections. A plurality of cavities 15 is formed in the bridging portion 4, and extend radially from the central bore 5. Each cavity 15 possesses a pair of side arms 16, the arms 16 between adjacent cavities serving jointly as one of the side arms of said adjacent cavities. The forward faces of the arms 16 form electron-receiving anode segments with relatively small spacing between each arm, thus presenting a plurality of slots to the electron stream emanating from the cathode 6.

Heretofore the side arms of each anode cavity of a plural cavity magnetron have extended back from the entrance slots substantially parallel with each other. However, the operation of such a device is improved when the side arms of each anode cavity 15 diverge from each other, preferably to as great an extent as possible. As shown in Fig. 1, the side arms 16 diverge in this way substantially to the rear of their associated cavities, where the back wall of each cavity extends around to join the two side walls to each other. This divergence is attained by providing each side arm 16 with straight side walls which converge from the inner end of said arm toward the rear of the associated cavity 15 for an appreciable distance.

The frequency of the oscillations generated by each anode cavity 15 is determined primarily by the space between the side walls of the cavity and the size of the cavity loop. Diverging the side arms of the cavity, as described above, does two things. First, by introducing a greater separation between the side walls of the cavity, the capacity is decreased; and second, by increasing the transverse area of the cavity, the inductance thereof is increased. For a predetermined resonant frequency, the product of capacity and inductance is a constant. In accordance with my invention, the inductance may be increased relative to the decrease in capacity so that the resonant frequency of my device remains substantially the same as that of prior devices of similar size. According to well-known circuit theory at lower wave lengths, $$Q=\frac{\omega L}{R}$$

where
$\omega=2\pi f$
f=frequency of the oscillations produced
L=inductance of the oscillating circuit, and
R=effective resistance of the oscillating circuit to the oscillatory currents.

By analogy with the above theory, we may consider that the inductance of each oscillating loop in my ultra-high frequency tube is increased enough to raise the Q of my system to a considerable degree. The higher the Q of such a device as I have disclosed becomes, the less will be the influence exerted by changes in voltage and electronic conditions, such as cathode emission, upon the frequency at which the device operates. Since under normal practical operating conditions, changes of the above nature inevitably occur, the increased Q of my device results in operation with a much more constant frequency.

By constructing each anode oscillating loop with a relatively small gap between the ends of the side arms and having those arms diverge sharply from the gap as above described, I have found that the improvements due to decreased capacity, increased inductance and correspondingly increased values of Q readily can be obtained. If an attempt were made to secure these improvements by increasing the size of the gap at the entrance to the oscillating loop, several adverse effects would be produced. With such an enlarged gap, in order to produce the desired frequency, the physical size of the loop would have to be increased to such an extent as to unduly enlarge the overall tube dimensions. Also the propagation of energy from one oscillating loop to the next would be slowed down, introducing relatively large phase differences between various parts of the tube together with the creation of the probability of the tube oscillating in undesired modes at undesired spurious frequencies. In magnetrons such as I have described, the electrons describe orbits about the cathode. For maximum effectiveness, the circular component of electronic speed around the cathode adjacent the anode surfaces should be substantially equal to the rate at which the generated wave is propagated from loop to loop around the tube. Thus the slowing down of the propagated wave which would result from an increase in the size of the entrance gap to each oscillating loop would tend to upset this desired condition of equality, and thus decrease the effectiveness of operation of the tube. The most satisfactory spacing between the side arms of each oscillating loop at the entrance gap thereto is of the order of that at which the transit time of electrons passing across the gap is less than about a quarter of a cycle of the oscillations which the tube is adapted to generate. Due to diverging arrangements of the anode arms in my construction, slight variations in the spacing between the ends of the arms produce smaller changes in capacity than in the case of previous constructions. Therefore, the over-all effect of my novel construction is to produce a device in which the spacing between the anode arms is not critical, and in which the tolerances of any machine work which might be necessary are substantially increased.

As already pointed out, my structure produces an increase in the transverse cross-sectional opening of each loop 15. I have found that in addition to this factor, increasing the inductance of the cavity, the ease of transfer of energy from one oscillating loop to the next is substantially increased, thus producing an increase in efficiency of the device.

When a magnetron such as I have described above is placed between suitable magnetic poles 17 and 18 to create a longitudinal magnetic field and the device is energized, oscillations are set up in each of the oscillating loops 15. The oscillatory energy thus generated in each of the loops 15 is readily propagated through the tube by transfer from one loop to the next, so that this energy may be led out readily from the tube by means of a coupling loop 19 extending into one of the oscillating loops 15 and having one end thereof fastened to the inner wall of said oscillating loop. The other end of the coupling loop 19 is connected to a lead wire 20 which passes through a glass seal 21 mounted at the outer end of a pipe 22 likewise hermetically fastened through the wall of the envelope 1. An additional conducting pipe, not shown, may be electrically connected to the pipe 22, and forms with the wire 20 a concentric line through which the high frequency oscillations generated by the magnetron may be conducted to a suitable utilization circuit.

Figure 3:
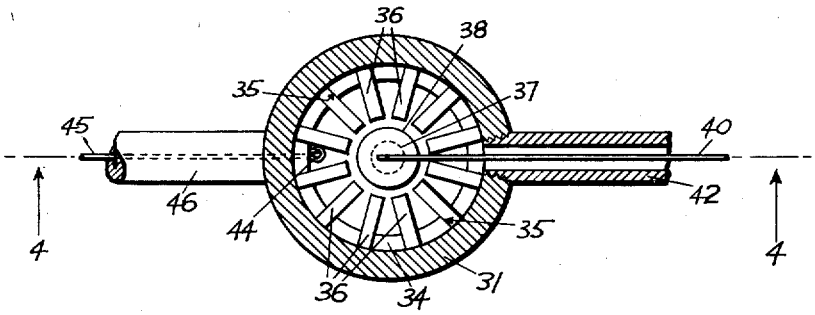
Fig. 3 is a cross-section similar to that of Fig. 1 of another embodiment of my invention taken along line 3—3 of Fig. 4.
Figure 4:
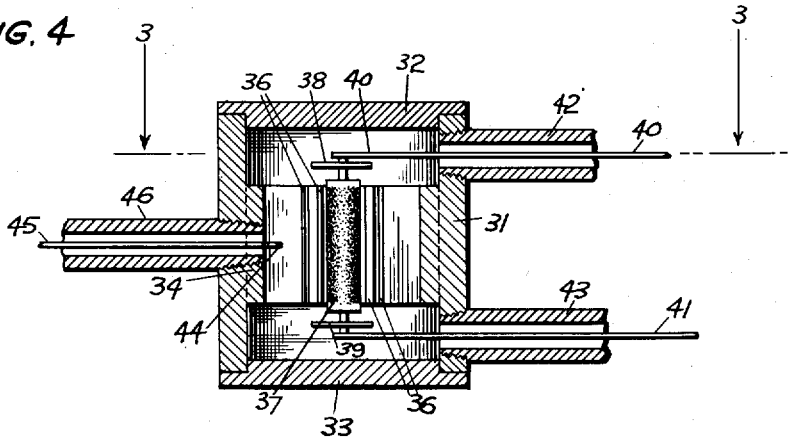
Fig. 4 is a longitudinal cross-section taken along line 4—4 of Fig. 3.

Since the spacing between the ends of the anode arms which forms the gap at the entrance to each oscillating cavity is not critical, my invention lends itself to constructions in which fine machine work is completely eliminated and which may be assembled from approximately machined parts and stamped members. Such an arrangement is shown in Figs. 3 and 4. The device shown in these figures comprises an envelope 31 which is likewise made of a block of conducting material, such as copper. The ends of the block are covered by caps 32 and 33 likewise formed of conductive material, such as copper. The envelope 31 is formed with a central annular projection 34 in which are cut a number of longitudinal slots 35. The machine work necessary for the formation of the envelope 31 and the slots 35 need not be of a very fine nature, since slight variations in the dimensions of the resulting structure do not have very marked effects on the operation of the device. A plurality of radial plates 36 is fastened into the slots 35, preferably by being soldered therein with a silver solder. The plates 36 may be stamped out of a sheet of highly conductive copper. The plates 36 thus form side arms of a plurality of oscillating anode cavities similar to those described in connection with Fig. 1. The inner ends of the plates 36 form anode faces which cooperate with a cathode 37 supported substantially centrally of said anode faces. The cathode 37 may be of a type similar to the catrode 6 of Fig. 1. Here likewise light conducting shields 38 and 39 may be supported adjacent the upper and lower ends of the cathode 37. The cathode itself is supported by a pair of cathode lead-in conductors 40 and 41 which pass out from the envelope 31 through pipes 42 and 43 in a manner similar to that described in connection with the lead-in conductors 9 and 10 of the arrangement in Figs. 1 and 2. The oscillations which are set up within the device shown in Figs. 3 and 4 may be led out from the tube by means of a coupling loop 44 connected to a lead wire 45 which passes from the tube through a pipe 46 in a manner similar to that described in connection with the loop 19 and conductor 20 of the arrangement shown in Figs. 1 and 2.

It will be seen that the point at which the plates 36 approach each other most closely forms the entrance gap to each of the oscillating anode loops, which gap is presented to the electron stream emanating from the cathode 37. Furthermore the side walls of each of the oscillating gaps diverge from each other from the entrance gap as described in connection with the arrangement shown in Figs. 1 and 2, and thus the arrangement of Figs. 3 and 4 possesses the advantages of my invention as already described.

Of course it is to be understood that this invention is not limited to the particular details as described above as many equivalents will suggest themselves to those skilled in the art.

What is claimed is:

1. An anode structure for an electron-discharge device of the magnetron type comprising: a cylindrical body provided with a plurality of inwardly-directed, radially-disposed vanes; each of said vanes having straight side walls which converge from the inner ends thereof toward said cylindrical body for an appreciable distance from said inner ends; adjacent vanes being connected to each other through said cylindrical body, and forming with the connecting portion of said body, a cavity resonator.

2. *An electron-discharge device comprising: a cathode; and an anode structure, spaced from said cathode, and including a plurality of anode members; each pair of adjacent anode members, together with that portion of said anode structure lying therebetween, defining a cavity resonator; each anode member having substantially straight side walls which converge for an appreciable distance from the inner toward the outer ends thereof.*

PERCY L. SPENCER.

No references cited.